Figure 5:
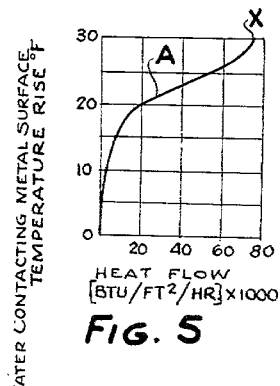

Aug. 24, 1965  J. J. TOROK  3,202,498
GLASS FORMING PLUNGER
Filed May 17, 1961  2 Sheets-Sheet 1
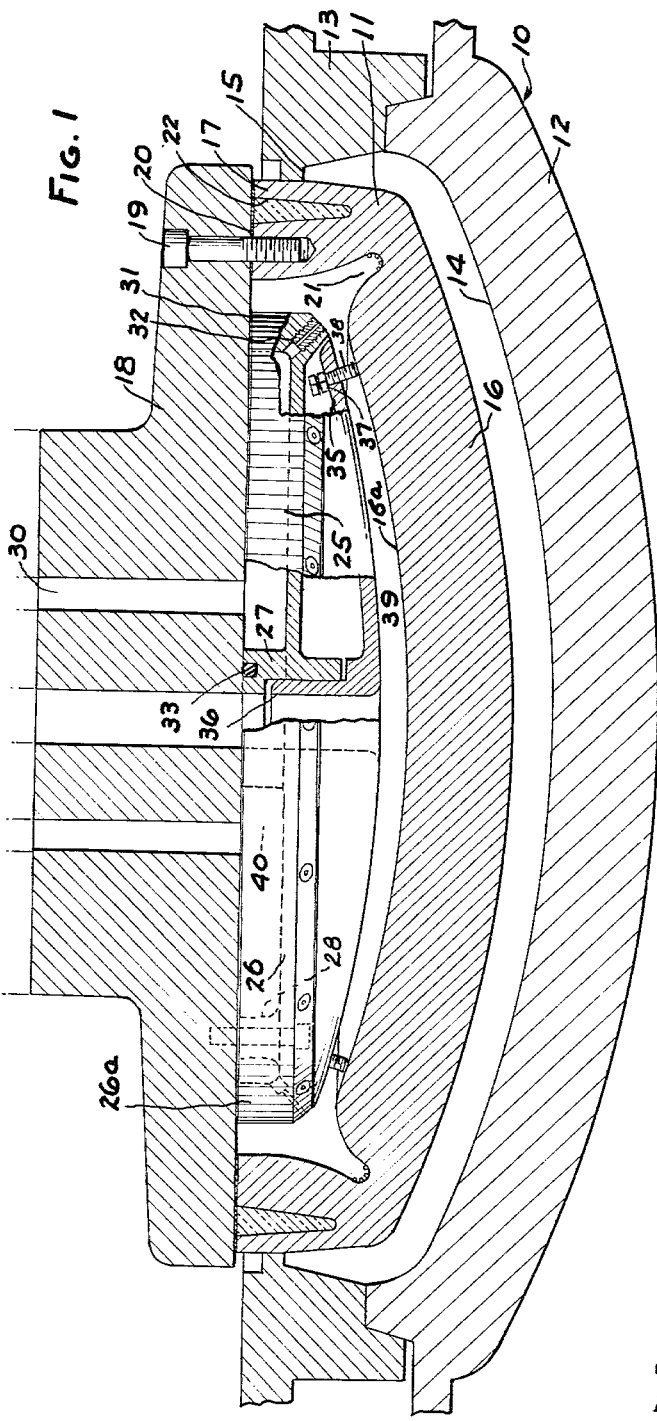
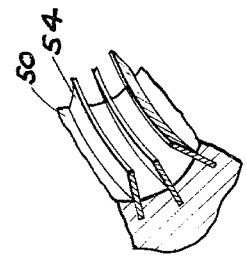
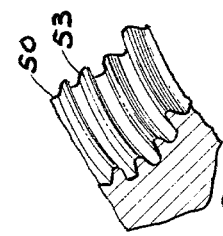
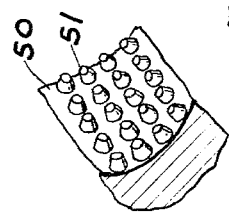
INVENTOR.
JULIUS J. TOROK
BY
E. J. Holler &
W. A. Schaich
ATTORNEYS

United States Patent Office 3,202,498
Patented Aug. 24, 1965

3,202,498
GLASS FORMING PLUNGER
Julius J. Torok, Toledo, Ohio, assignor, by mesne assignments, to Owens-Illinois Glass Company, Toledo, Ohio, a corporation of Ohio
Filed May 17, 1961, Ser. No. 110,806
4 Claims. (Cl. 65—362)

This application is a continuation-in-part of my copending applications, Serial Numbers 763,384 and 763,351, filed September 25, 1958, which are now Patents 3,054,220 and 3,078,696, respectively.

This invention relates to the forming of glass articles and particularly to the molding by pressing of a glass article having a base and a flange extending around the periphery of the base and forming an angle therewith.

In making of glass articles, such as the face plates of television picture tubes and glass block halves which have a base and a flange extending around the periphery of the base and forming an angle with the base, a gob of glass is placed in a mold having an internal molding surface corresponding to the external configuration of the article which is to be formed and a plunger is moved downwardly to press and form the glass. The plunger has an external molding surface corresponding to the internal configuration of the glass article which is to be formed.

In the making of glass articles in accordance with such a method it is essential that the forming surfaces of the mold and the plunger be maintained within predetermined temperatures. If the forming surfaces have too high a temperature the glass will stick. This will necessitate a stoppage of the forming equipment in order to repair the damage caused by sticking. If the glass-forming surfaces are at too low a temperature, a crizzle or wrinkle will be formed in the glass article. Either of these conditions is obviously undesirable and it is necessary that the glass-forming surfaces be operated at temperatures between the two extremes in order that glass articles may be successfully formed at low cost.

In order to achieve this, it has been necessary to cool the surfaces of the mold, opposite the molding surfaces, with water.

In the design of plungers of this type, it has been commonly assumed that the internal surface of the plunger which is contacted by the water is at the same temperature as the water. In order to increase the effectiveness of the water which is used for cooling the plunger, it has been thought necessary to either increase the amount of water being circulated or reduce the thickness of the plunger at that particular area as disclosed in my copending applications Serial Nos. 763,384, now Patent 3,054,220, and 763,351, filed September 25, 1958.

Even with the best possible design, it has been found that there is a maximum speed beyond which the plunger cannot be operated without exceeding the working limits of temperature. If the speed of operation is increased beyond this point, the temperature of the plunger rises in an unpredictable manner resulting in sticking of the glass.

It is an object of this invention to provide a plunger which may be operated at higher speed than has been heretofore possible for the same part being made out of the same glass.

It is a further object of the invention to provide such a plunger wherein the increased production can be obtained at minimum cost.

Basically, the invention comprises providing a peripheral groove at the area of juncture of the flange portion and base portion of the plunger on the inner surface thereof and a plurality of inwardly extending fins or ribs in the groove which are thermally bonded to the surface of the plunger and extend into the path of the cooling liquid.

I have recognized for the first time that, at high speeds, the inner surface of the plunger is not at the temperature of the liquid and that film boiling occurs at the inner surface which results in a loss of control of temperature. To eliminate this condition, under particular operating conditions, according to the invention, the heat flow through a particular area is determined and then sufficient extended surface in the form of fins or ribs is provided to reduce the heat flow density at that particular area below that point at which a film boiling will occur so that the outer surface of the plunger will operate within the proper limits (nucleate boiling) of temperature.

Figure 6:
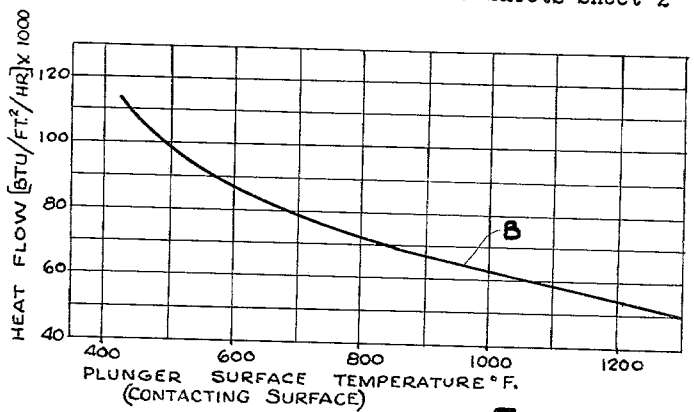
Figure 7:
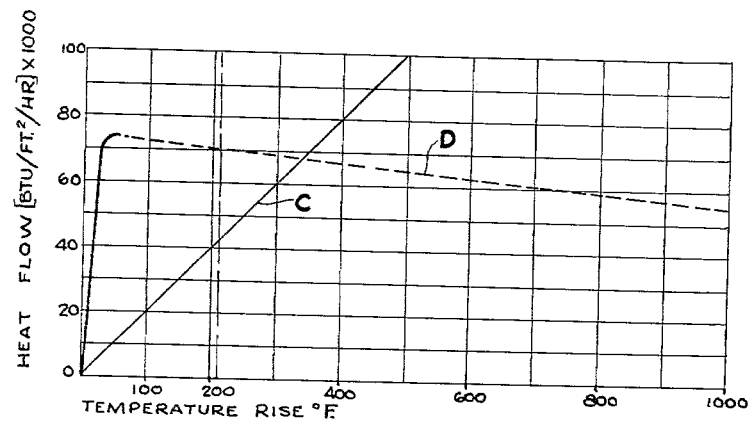
Figure 8:
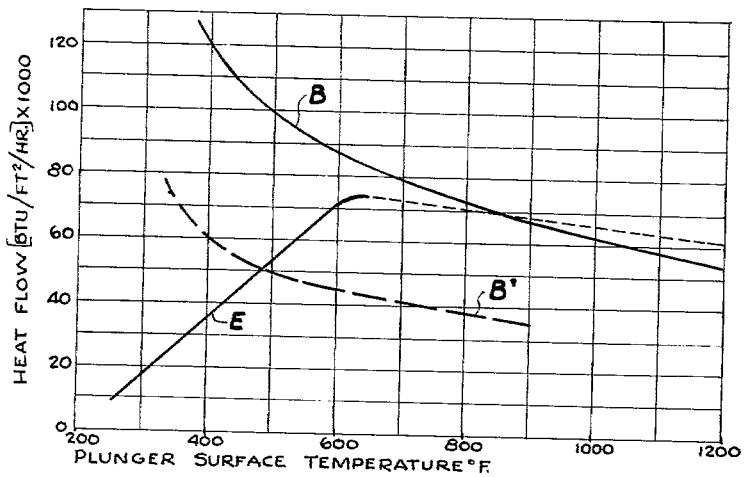

In the drawings:
FIG. 1 is a sectional elevational view of a glass forming apparatus embodying the invention.
FIG. 2 is a fragmentary perspective of a portion of the plunger shown in FIG. 1.
FIG. 3 is a view similar to FIG. 2 showing a modified form of plunger.
FIG. 4 is a view similar to FIG. 2 showing a further modified form of plunger.
FIG. 5 is a curve of temperature rise versus heat flow in a plunger.
FIG. 6 is a curve of heat flow versus plunger glass contacting surface temperature.
FIG. 7 is a curve of heat flow versus temperature rise in a plunger.
FIG. 8 is a curve of heat flow versus plunger surface temperature.

Referring to FIG. 1, a mold 10 is provided into which a gob of glass is deposited by suitable means well known in the art and thereafter plunger 11 is brought downwardly into contact with the glass to press and form the glass article.

As shown in FIG. 1, mold 10 comprises a base section 12 and a peripheral section 13 defining an internal molding surface 14 which has a configuration corresponding to the external configuration of the glass article which is to be formed. Peripheral section 13 includes an inwardly extending peripheral lip 15 which defines the upper end of the flange which is to be formed on the glass article.

Plunger 11 includes a base portion 16 and a flange portion 17 and is mounted on a head 18 by bolts 19 threaded into flange portion 17 of the plunger 11. A gasket 20 is interposed between the upper end of flange portion 17 of plunger 11 and head 18. Head 18 is adapted to be moved upwardly and downwardly by a suitable mechanism (not shown) known in the art, such as a hydraulic ram.

The specific construction of plunger 11 may vary but preferably is of the type disclosed and claimed in my copending application, Serial No. 763,351, titled "Forming Glass Articles." In such a plunger 11, a base portion 16 is of substantially uniform thickness and flange portion 17 extends around the periphery of said base portion and forms an angle not exceeding 90° thereto. A peripheral groove 21 is provided in the area of juncture of the base portion 16 and flange portion 17 on the side of the plunger opposite the molding surface. In addition, a slot 22 is provided in the upper end of flange portion 17. Slot 22 is preferably filled with an insulating material 23 such as asbestos.

Liquid coolant is directed against the base of groove 21 at the area of juncture of base portion 16 and flange portion 17 and a rotary motion is imparted to the liquid coolant. In addition, the liquid coolant is guided at a uniform rate along the surface of base portion 16 opposite the molding surface of the plunger from the periphery toward the center and is thereafter removed from the plunger.

As shown in FIGS. 1 and 2, a distributor 25 is provided between head 18 and plunger 11 and comprises a circular plate 26 and a hub 27 at the center of the plate. Bolts 28 extend through circumferentially spaced bosses 29 to support distributor 25 on the lower end of head 18. A lip 26a is formed on the periphery of plate 26 and extends upwardly into contact with gasket 20. Liquid coolant is forced under pressure through circumferentially spaced vertical openings 30 in head 18 into the space 40 between plate 26 and lower end of the head. A plurality of nozzles is provided in the periphery of the distributor. Each nozzle comprises a plug 31 threaded into an opening in the distributor. Each plug is formed with a nozzle opening 32 which has its axis inclined horizontally to a radial plane intersecting the axis of plunger 11. In this fashion, a plurality of streams or jets of liquid coolant are directed at the area of juncture of the periphery of base portion 16 and flange portion 17 of plunger 11, that is, into groove 21. An O-ring type gasket 33 is provided on the upper end of hub 27 to provide a seal and prevent the liquid coolant from passing from the inlet directly to the outlet opening 34 in head 18.

A disc 35 is provided below distributor 25 and includes a sleeve 36 extending upwardly into hub 27. The upper end of sleeve 36 is spaced from the base of the opening of the hub in which it extends so that disc 35 has limited reciprocating movement relative to hub 27 and, in turn, distributor 25. Bolts 37 locked in position by lock nuts 38 are provided at circumferentially spaced points along the periphery of disc 35 and extend through the disc into contact with the inner surface of base portion 16. By this arrangement, the lowermost position of disc 35 is adjusted so that the disc is always out of contact with the inner surface of base portion 16.

In operation, gobs of glass are periodically fed to mold 14 and plunger 16 is moved downwardly into contact with each gob to form the glass article.

During the operation of the forming equipment, liquid coolant is forced under pressure through openings 30 into the space between the lower end of head 18 and distributor 25. Coolant is then directed in a plurality of streams or jets at the area of juncture of the base portion 16 and flange portion 17. Since the axes of the jets are at an angle to a radial line intersecting the axis of the plunger, a rotary motion is imparted to the coolant. The liquid coolant fills the space 40 between the undersurface of plate 26 and the upper surface of disc 35 forcing disc 35 downwardly and bringing the ends of bolts into contact with the inner surface 16a of base portion 16. The restricted flow through space 39 between disc 35 and base portion 16 causes a small pressure drop which produces a differential pressure between the space 40 and the space 41 insuring that the disc 35 is urged downwardly into proper position with respect to the surface.

The undersurface of disc 35 is so shaped relative to the surface of base portion 16 of plunger 11 that the liquid, as it flows from the periphery of the base portion to the center thereof, flows at a constant velocity. In other words, the cross-sectional area of the space 41 between the lower or undersurface of disc 35 and the inner surface of base portion 16 is such that it increases in size from the periphery to the center so that a constant velocity of liquid will be permitted to flow. The liquid coolant is withdrawn through sleeve 36 and outlet 34.

The surface of the plunger 16 against which the coolant is directed is preferably roughened in order to obtain the best possible heat transfer. The roughening may be achieved by knurls or in any other suitable manner such as ribs. The roughening should be sufficient to insure heat transfer but not so deep as to form stagnant pockets of cooling.

The apparatus heretofore described is similar to that disclosed and claimed in my copending application Serial No. 763,384.

According to the invention, the surface 50 of the groove 21 is formed with extended surfaces in the form of integral fins 51 which are circumferentially and radially spaced and extend into the path of the liquid coolant as shown in FIG. 2. The fins 51 reduce the heat flow density at the groove resulting in a cooler operating surface on the inner surface at the groove. As a result, the plunger can be operated at a higher rate without exceeding the temperature operating limit.

Instead of utilizing isolated fins 51, peripherally extending grooves 53 may be provided in the groove as shown in FIG. 3. Alternatively, ribs 54 embedded or thermally bonded in the groove can be provided as shown in FIG. 4.

The theory upon which the invention is based can be more readily understood by reference to FIGS. 5 to 8. FIG. 5 is a curve of temperature rise of the water cooled surface versus heat flow. The temperature rise is the difference between the temperature of the inner surface of the plunger and the water being circulated over the inner surface of the plunger. Since the thermal conductivity of water is very low, with increased heat flow the temperature rise in the water follows the curve shown in FIG. 5 until a point is reached at which the temperature rise is very rapid. I have determined that this occurs because of the formation of bubbles due to boiling at the inner surface of the plunger. As the nucleate boiling increases, a film of bubbles is formed completely separating the water from the surface of the plunger resulting in a high temperature rise in the surface of the plunger. By reducing the speed of operation of the plunger, the heat flow may be reduced sufficiently to prevent the uncontrolled temperature rise of the plunger.

I have found that the limiting speed of operation of the plunger is determined by occurrence of film boiling. At any speed at which film boiling occurs, it can be eliminated by applying extended surfaces in the form of fins or ribs at the areas of high heat density. The amount of heat transferred to the water will be increased.

As shown in FIG. 6, which is a curve of heat flow versus outer plunger surface temperature, if the glass contacting surface temperature is 675° F., 80,000 B.t.u.'s must be dissipated per square inch. According to FIG. 5, this will result in film boiling. However, if the surface at which this high heat density occurs is extended, as by ribs or fins, the heat flow per square inch is reduced below 80,000 B.t.u.'s. For example, if the area is doubled, then the heat flow per square unit of area will be 40,000 B.t.u.'s per square inch which, as shown in FIG. 5, is well within or below the film boiling point X so that the plunger will operate satisfactorily at that speed.

FIG. 7 shows two curves. Curve C represents the heat flow versus temperature rise between the inner and outer surfaces of the plunger. Curve D represents the heat flow versus temperature rise between the temperature of the inner surface of the plunger and the water temperature.

FIG. 8 is a composite between FIGS. 6 and 7. Curve B′ shows the curve of FIG. 6 when the surface is extended by ribs or fins resulting in a decrease in heat flow density. Curve E is the heat flow versus temperature rise difference between inner and outer surfaces. It can be seen that a plunger with extended surfaces, represented by curve B′, operates below the points where control of plunger temperature is lost.

In the application of the corrugated surfaces, it is preferred to provide the surfaces of sufficient area to accomplish the desired reduction in heat flow density. In addition, the surfaces can be of a more highly conductive material to give a lesser drop in temperature. In this connection, it is preferred to provide a plurality of short ribs and fins rather than a few longer ribs or fins. On the contrary, longer fins or ribs are to be avoided since they result in too great a temperature drop in the ribs so that the temperature difference between the water and the surface of the plunger is less resulting in a lesser transfer of heat.

Thus, by adding the fins or ribs, the threshold temperature of nucleate boiling is not exceeded so that the plunger can be operated at a higher rate than has been heretofore possible without the use of the extended surfaces in the form of fins or ribs.

It should be appreciated that the exact point of film boiling cannot be definitely established in advance since it also depends on other factors such as gases in the water which tend to lower the film boiling point, surface tension wetability, wherein a lesser wetting produces a lower film boiling point, and pressure of water, wherein a lower pressure results in a lower film boiling point.

I claim:

1. In an apparatus for forming a glass article having one portion connected to the other by a curved portion of small radius wherein said apparatus includes a mold and a plunger which is moved relative to the mold to press the gob of glass, the internal surface of the mold having a configuration corresponding to the external surface of the article which is to be formed, said plunger having an external surface corresponding to the internal surface of the article to be formed and comprising a base portion and a flange portion connected to said base portion by a sharply curved portion at the area of juncture with the base portion and extending upwardly from the base portion, said plunger having an internal surface and means for circulating a liquid coolant across said internal surface to continuously remove heat and cool the plunger, said plunger being formed with a peripheral groove therein in the inner surface thereof opposite the molding surface thereof at the curved portion, the improvement for eliminating film boiling at the inner surface of the plunger at the groove which comprises means defining a plurality of extended thermally bonded surfaces on the internal surface of the plunger at said peripheral groove, said surfaces extending into the path of the liquid coolant.

2. The combination set forth in claim 1 wherein said extended surfaces comprise a plurality of peripherally extending continuous fins thermally bonded to the internal surface of the plunger at said groove.

3. The combination set forth in claim 1 wherein said extended surfaces comprise a plurality of integral circumferentially isolated fins positioned on the internal surface of the plunger at said groove and extending into the path of the liquid coolant.

4. In an apparatus for forming a glass article having one portion connected to the other by a curved portion of small radius wherein said apparatus includes a mold and a plunger which is moved relative to the mold to press the gob of glass, the internal surface of the mold having a configuration corresponding to the external surface of the article which is to be formed and the external surface of the plunger having a configuration corresponding to the internal surface of the article to be formed, said plunger having an internal surface and means for circulating a liquid coolant across said internal surface to continuously remove heat and cool the plunger, the improvement comprising a plurality of extended thermally bonded surfaces on the internal surface of the plunger at the curved portion thereof, said surfaces extending into the path of the liquid coolant.

References Cited by the Examiner
UNITED STATES PATENTS

| | | | |
|---|---|---|---|
| 2,688,823 | 9/54 | Weber | 65—362 |
| 3,054,220 | 9/62 | Torok | 65—362 |

DONALL H. SYLVESTER, *Primary Examiner.*